US007898998B2

(12) United States Patent
Yoneda et al.

(10) Patent No.: US 7,898,998 B2
(45) Date of Patent: Mar. 1, 2011

(54) MULTICAST DISTRIBUTION DEVICE AND MULTICAST DISTRIBUTION METHOD

(75) Inventors: Takahiro Yoneda, Osaka (JP); Kazunobu Konishi, Osaka (JP); Eiichi Muramoto, Osaka (JP)

(73) Assignee: Panasonic Corporation, Osada (JP)

(*) Notice: Subject to any disclaimer, the term of this patent is extended or adjusted under 35 U.S.C. 154(b) by 27 days.

(21) Appl. No.: 12/282,776

(22) PCT Filed: Feb. 13, 2007

(86) PCT No.: PCT/JP2007/052502
§ 371 (c)(1),
(2), (4) Date: Sep. 12, 2008

(87) PCT Pub. No.: WO2007/105397
PCT Pub. Date: Sep. 20, 2007

(65) Prior Publication Data
US 2009/0116482 A1 May 7, 2009

(30) Foreign Application Priority Data
Mar. 14, 2006 (JP) .................. 2006-070039

(51) Int. Cl.
*H04H 1/00* (2006.01)
*H04J 3/26* (2006.01)
(52) U.S. Cl. ........................ 370/312; 370/432
(58) Field of Classification Search ........................ None
See application file for complete search history.

(56) References Cited
U.S. PATENT DOCUMENTS
7,085,745 B2 *  8/2006  Klug ..................... 705/401
2002/0126698 A1 *  9/2002  Deshpande ............ 370/467
2002/0181494 A1 * 12/2002  Rhee .................... 370/465
2003/0117945 A1 *  6/2003  Zboril .................... 370/216
2004/0076118 A1 *  4/2004  Ho et al. ................ 370/235
2004/0174886 A1 *  9/2004  Packer .................. 370/395.52
2004/0218603 A1 * 11/2004  Lee et al. .............. 370/390
2006/0223520 A1 * 10/2006  Laroia et al. .......... 455/422.1
2007/0005804 A1 *  1/2007  Rideout ................. 709/246

FOREIGN PATENT DOCUMENTS
JP      2002-354033     12/2002

OTHER PUBLICATIONS
International Search Report dated Mar. 13, 2007.
T. Yoneda, et al., "Evaluation of Congestion Control Method using Multiple-Constant Bit Rate Streams over XCAST6," Internet conference 2005 program, online, Oct. 27, 2005.

* cited by examiner

*Primary Examiner* — Hong Cho
*Assistant Examiner* — Eunsook Choi
(74) *Attorney, Agent, or Firm* — Dickinson Wright PLLC (57) ABSTRACT

Provided is a multicast distribution device for transmitting a packet in which a reception node can easily perform signal synchronization between a plurality of hierarchized data. The multicast distribution device (100) includes an input unit (110), a hierarchy encoding unit (112), a communication control unit (114), a flow rate control unit (116), a reception node sorting unit (118), a hierarchy setting unit (120), a hierarchy information storage unit (122), and a reception node information storage unit (124). The reception node sorting unit (118) decides the order of addresses described in an address list of a packet of each hierarchy in the descending order from the most significant hierarchy to the least significant hierarchy. When deciding the address order for an arbitrary hierarchy, the address order decided in the more significant hierarchy by one step is acquired as it is and after this, the address order of the remaining reception node is decided.

11 Claims, 10 Drawing Sheets

| RECEIVING NODE (ADDRESS) | ALLOWED TRANSMISSION RATE |
| --- | --- |
| R1 | 30Mbps |
| R2 | 35Mbps |
| R3 | 15Mbps |
| R4 | 10Mbps |
| R5 | 3Mbps |

| LAYER | LAYER BAND | RECEIVING NODE (ADDRESS) |
|---|---|---|
| A | 15Mbps | R1,R2 |
| B | 8Mbps | R1,R2,R3,R4 |
| C | 2Mbps | R1,R2,R3,R4,R5 |

FIG.9A

| LAYER | LAYER BAND | RECEIVING NODE (ADDRESS) |
|---|---|---|
| A | 15Mbps | R2,R1 |
| B | 8Mbps | R2,R1,R3,R4 |
| C | 2Mbps | R2,R1,R3,R4,R5 |

MULTICAST DISTRIBUTION DEVICE AND MULTICAST DISTRIBUTION METHOD

TECHNICAL FIELD

The present invention relates to a multicast distribution apparatus and a multicast distribution method. More particularly, the present invention relates to a multicast distribution apparatus and a multicast distribution method based on a layered multicast scheme using an explicit multicast scheme.

BACKGROUND ART

In recent years, one transmitting node often sends packets of the same content to a plurality of receiving nodes in, for example, video distribution using the Internet. In such a case, when the transmitting node distributes packets under the unicast scheme, the amount of data transmitted by the transmitting node increases in proportion to the number of receiving nodes. In such a case, the transmitting node often distributes packets in the multicast scheme. In the multicast scheme, a router located in the middle of a route duplicates a packet as required, so that the transmitting node needs only to send one packet, thereby efficiently using the network bandwidth.

In multicast distribution, the network bandwidth where receiving nodes can receive as input are different, and so, when the transmitting node sends data in accordance with a specific receiving node, there is a problem that other receiving nodes cannot efficiently use the network bandwidth. The layered multicast scheme is one of schemes to solve this problem.

In the layered multicast scheme, first, based on a video signal or the like inputted from a camera for example, layered data formed with a base layer and at least one differential layers is created using a layered coding technique first. The layered data created is delivered to a plurality of receiving nodes. In this case, the receiving node receives layered data of appropriate differential layers matching the performance, communication environment and desired video quality of the receiving node in addition to layered data of the base layer. Generally, by receiving more layered data of differential layers, the receiving node can play back higher-quality video.

In the layered multicast scheme, when the transmitting node sets up a plurality of receiving nodes per layer as distribution destinations, the transmitting node generally uses implicit multicast scheme. On the other hand, Patent Document 1 discloses a method whereby a transmitting node sets up the transmission destination using the explicit multicast scheme in layered multicast distribution.

Before explaining the invention disclosed in Patent Document 1, the explicit multicast scheme will be explained here first.

The explicit multicast scheme represented by XCAST is a multicast scheme whereby a transmitting node explicitly specifies receiving nodes by listing unicast addresses of a plurality of destination receiving nodes in an option header or payload of a packet (see Non-Patent Document 1). Hereinafter, XCAST will be explained as an example of the explicit multicast scheme with reference to accompanying drawings.

Figure 1:
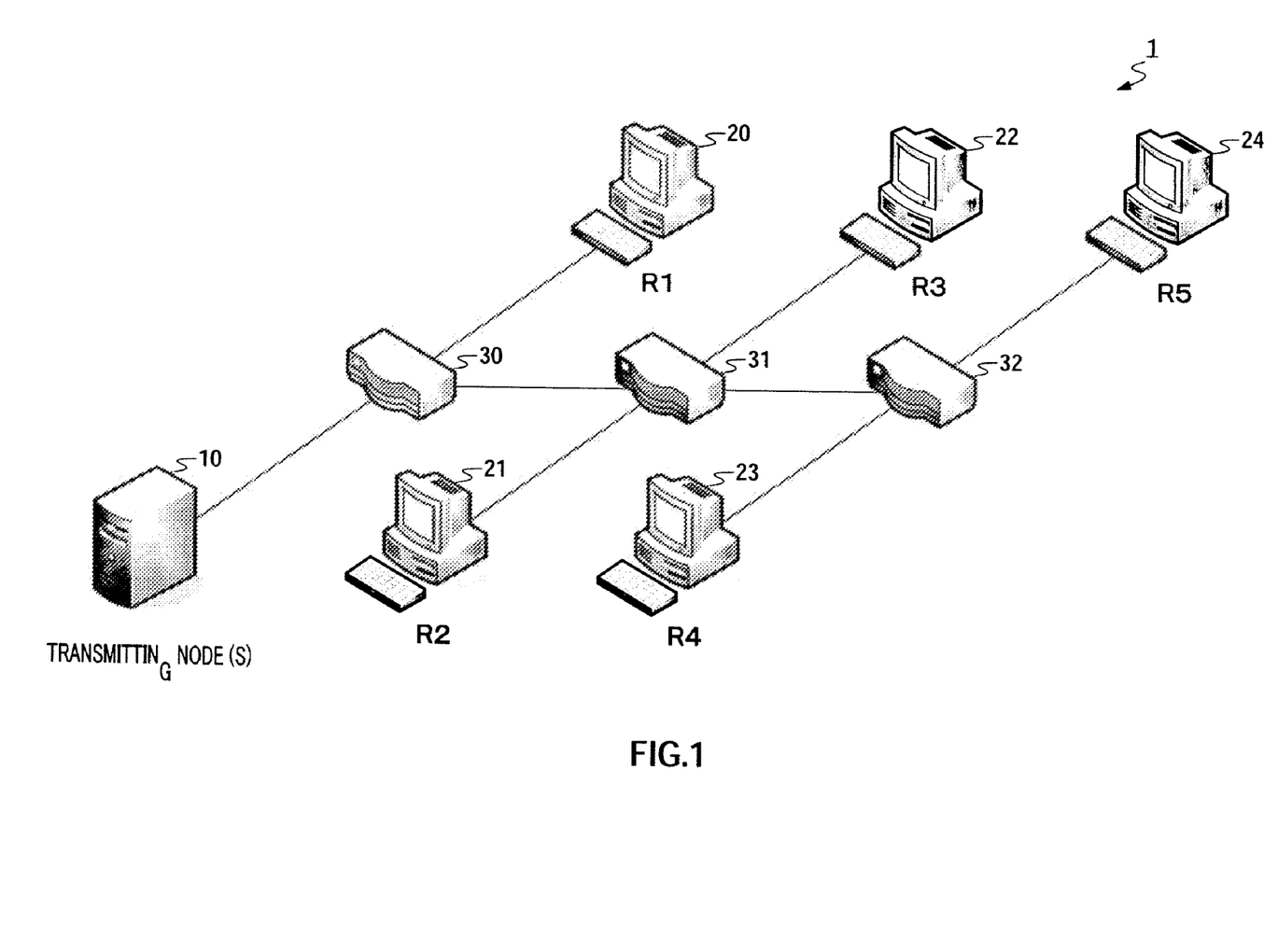
FIG. 1 illustrates an overview of a communication network for explaining the step of multicast distribution using a conventional multicast distribution apparatus as a transmitting node.

FIG. 1 shows an overview of a communication network for explaining XCAST. FIG. 2 illustrates schematic configurations of an XCAST packet.

Communication network 1 in FIG. 1 is constructed of one transmitting node 10, five receiving nodes 20 to 24 and three routers 30 to 32.

Transmitting node (S) 10 creates layered data from inputted original data through layered coding and creates packets by adding information such as destination address to the layered data created. Furthermore, transmitting node (S) 10 sends the packets created to communication network 1.

Receiving nodes (R1 to R5) 20 to 24 receive the packets delivered by transmitting node 10. Furthermore, receiving nodes 20 to 24 decode the received data and combine the base layer data and the differential layer data.

Routers 30 to 32 execute routing based on the destination address information included in each packet.

In this communication network 1, a case is assumed where transmitting node 10 sends a packet to first receiving node (R1) 20, third receiving node (R3) 22 and fourth receiving node (R4) 23. The packet created by transmitting node 10 is, for example, as shown in FIG. 2A.

Figure 2A:
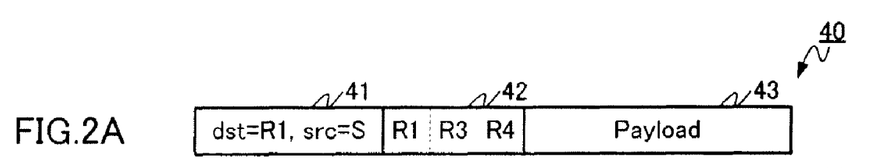
FIG. 2A shows an XCAST packet when the transmitting node sends a packet to a first receiving node, the third receiving node and the fourth receiving node.
Figure 2B:
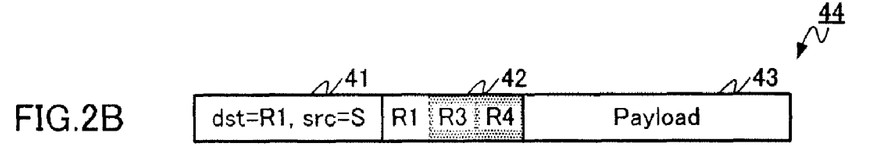
FIG. 2B shows an XCAST packet sent to the first receiving node by a first router that supports XCAST.
Figure 2C:
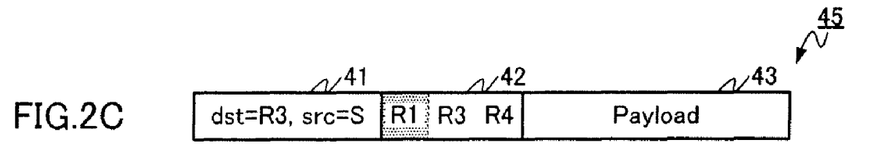
FIG. 2C shows an XCAST packet transferred to a second router by the first router that supports XCAST.
Figure 2D:
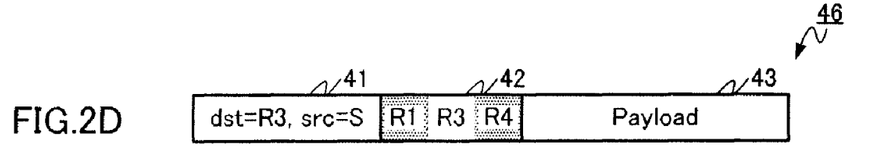
FIG. 2D shows an XCAST packet sent to the third receiving node by the second router that supports XCAST.

As shown in FIG. 2A, IPv6 packet 40 in XCAST scheme has unicast header 41, routing header 42 and payload 43. IPv6 packet 40 actually has other headers, but the explanations will be omitted here for ease of explanation.

Unicast header 41 is an area to describe one destination address and one source address. For example, packet 40 in FIG. 2A lists the address of R1 (dst=R1) as the destination address and the address of S (src=S) as the source address. The destination address listed in unicast header 41 is the highest undelivered address among the addresses listed in routing header 42 (described later). By listing one unicast address of the receiving node in unicast header 41, even if a router in the route does not support XCAST, the router can recognize XCAST packet 40 as a unicast packet and can transfer the packet to the receiving node specified as the destination address of the unicast header.

Routing header 42 is an area to describe an address list of destination receiving nodes. Furthermore, routing header 42 also includes a flag showing whether or not the packet is distributed to each address of the receiving node. Packet 40 in FIG. 2A describes the addresses of the first receiving node (R1), the third receiving node (R3) and the fourth receiving node (R4). The addresses in the address list are arranged in order, and in the case of packet 40 in FIG. 2A, for example, R1 located on the left in the figure is the highest and R4 located on the right is the lowest. As described above, the highest undelivered address in routing header 42 is described in unicast header 41 as the destination address.

Payload 43 is the body of data to be transmitted such as video encoding data.

Next, in communication network 1 in FIG. 1, the operations of the routers will be explained when transmitting node 10 sends packet 40 in FIG. 2A to first receiving node 20, third receiving node 22 and fourth receiving node 23. Here, optimization to a unicast packet will not be taken into consideration for ease of explanation.

First, transmitting node 10 sends packet 40 in FIG. 2A to first router 30.

First router 30 duplicates and transfers packet 40 with reference to the address list in received packet 40. In this case, packet 40 in FIG. 2A is duplicated into packet 44 (FIG. 2B) addressing the first receiving node (R1) in which the addresses of the third receiving node (R3) and fourth receiving node (R4) are designated as already delivered and packet 45 (FIG. 2C) addressing the third receiving node (R3) and fourth receiving node (R4) in which the address of the first receiving node (R1) is designated as already delivered and further the destination address of the unicast header is replaced by the address of the third receiving node (R3). After the packet is duplicated, packet 44 is sent to first receiving node 20 and packet 45 is transferred to second router 31.

Similar to first router 30, second router 31 duplicates and transfers packet 45 with reference to the address list in received packet 45. In this case, packet 45 is duplicated into packet 46 (FIG. 2D) addressing third receiving node (R3) and packet 47 (FIG. 2E) addressing fourth receiving node (R4). After the packet is duplicated, packet 46 is sent to third receiving node 22 and packet 47 is transferred to third router 32.

Figure 2E:
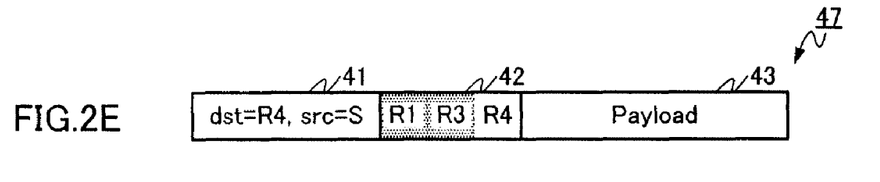
FIG. 2E shows an XCAST packet transferred to the third router by the second router that supports XCAST.

Similar to first router 30 and second router 31, third router 32 duplicates and transfers packet 47 with reference to the address list in received packet 47. In this case, packet 47 is transferred to fourth receiving node 23 as is.

In this way, when a router in the communication network supports XCAST, the router efficiently delivers the packet to each receiving node while duplicating and transferring the packet with reference to the address list in the received packet.

Next, the operation of the routers and receiving nodes will be explained in a case where the routers in the communication network do not support XCAST. Here, a case is assumed where no routers 30 to 32 in FIG. 1 support XCAST. A case will be explained where transmitting node 10 sends packet 48 in FIG. 3A (same as packet 40 in FIG. 2A) to first receiving node 20, third receiving node 22 and fourth receiving node 23.

Figure 3A:
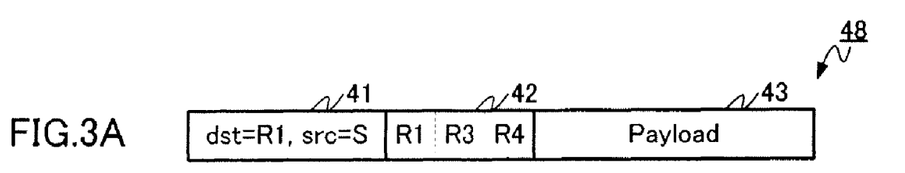
FIG. 3A shows an XCAST packet when the transmitting node sends a packet to the first receiving node, third receiving node and fourth receiving node.

First, transmitting node 10 sends packet 48 to first router 30. First router 30 transfers packet 48 with reference to the destination address in unicast header 41. In this case, packet 48 is transferred to first receiving node 20 described in unicast header 41.

First receiving node 20 receives packet 48 and also generates new packet 49 (FIG. 3B) with reference to the address descried in the address list. To be more specific, the address of the first receiving node (R1) in the address list in packet 48 is designated as already delivered. At the same time, the destination address in unicast header 41 is changed from the address of first receiving node (R1) 20 to the address of third receiving node (R3) 22 which is the highest undelivered address in the address list. Newly generated packet 49 is sent to first router 30.

Figure 3B:
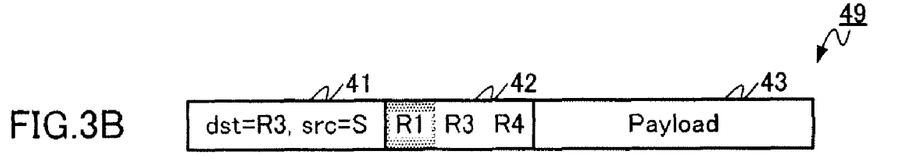
FIG. 3B shows an XCAST packet transferred to the third receiving node by the first receiving node.

First router 30 transfers packet 49 with reference to the destination address in unicast header 41. In this case, packet 49 is transferred to second router 31 directed to third receiving node 22 described in unicast header 41. Likewise, second router 31 sends the packet to third receiving node 22 with reference to the destination address in unicast header 41.

Third receiving node 22 receives packet 49 as in first receiving node 20 and also generates new packet 50 (FIG. 3C) with reference to the address described in the address list. Newly generated packet 50 is sent to second router 31.

Figure 3C:
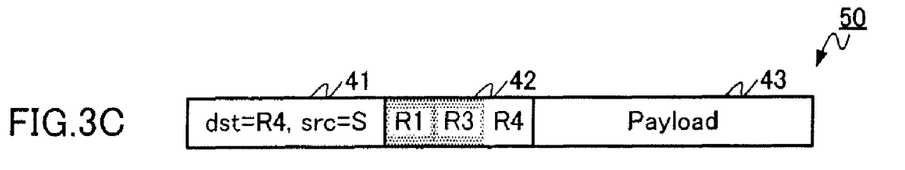
FIG. 3C shows an XCAST packet transferred to the fourth receiving node by the third receiving node.

Similar to first router 30 and second router 31, second router 31 and third router 32 transfer packet 50 to fourth receiving node 23 with reference to the destination address in unicast header 41.

In this way, when a router in the communication network does not support XCAST, the router does not duplicate a packet and transfers the packet received as the unicast packet to a receiving node designated as the destination address of the unicast header. The description of the destination addresses in the unicast header follows the order of the address list in the routing header. Therefore, a packet is delivered by the packet transfer between the receiving nodes and the order of delivery depends on the order in the address list described by the transmitting node in the routing header.

As described above, the explicit multicast scheme is a scheme whereby a transmitting node explicitly specifies a receiving node by describing the addresses of a plurality of destination receiving nodes in the option header or payload of a packet. Furthermore, in the case of XCAST in particular, even if a router in the communication network does not support XCAST, packets can be delivered in the order in the address list described in a routing header as unicast packets.

Here, the invention disclosed in Patent Document 1 will be explained. Patent Document 1 discloses a method (a program and an apparatus) of setting up the packet distribution destination using an explicit multicast scheme when the flow rate is controlled using a layered multicast scheme.

According to this method, the receiving node judges the occurrence of packet loss or congestion from the sequence number of a received packet and feeds back the reception conditions to the transmitting node on a regular term or when congestion occurs. This feedback information includes the time stamp showing the transmission time described in a packet which triggered feedback (time stamp showing the transmission time is given by the transmitting node) in addition to the situation of packet loss. The transmitting node learns the situation of packet loss of the receiving node and delay information from the transmitting node to the receiving node from this feedback information. The transmitting node each calculates an allowed transmission rate for a receiving node using these values and then each determines a layer of layered data to be received by a receiving node. Then, in packet delivery of the layers, the transmitting node sends packets with the address list where destination receiving nodes are assigned.

Hereinafter, the operations of the transmitting node according to the invention disclosed in Patent Document 1 will be explained specifically using communication network 1 in FIG. 1. In a case where a plurality of pieces of layered data depend upon each other when the data is received and combined, a differential layer that is required to receive and play back higher quality data is referred to as a "higher layer," and conversely, a layer required to combine the higher layers is referred to as a "lower layer."

Figure 4:
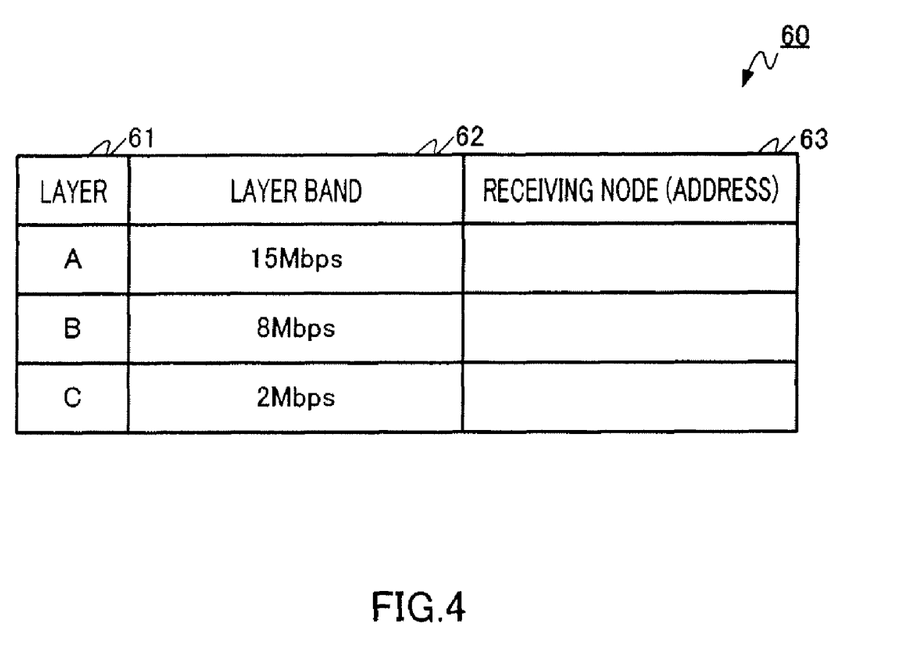
FIG. 4 is a table showing an example of the layer information.

FIG. 4 is a table showing an example of the layer configuration in a layered multicast communication. Layer C is a base layer that corresponds to the lowest layer and generates data of 2 Mbps. Layer B is a differential layer that corresponds to a layer higher than layer C and generates data of 8 Mbps. Layer A is a differential layer which corresponds to the highest layer and generates data of 15 Mbps.

Figure 5:
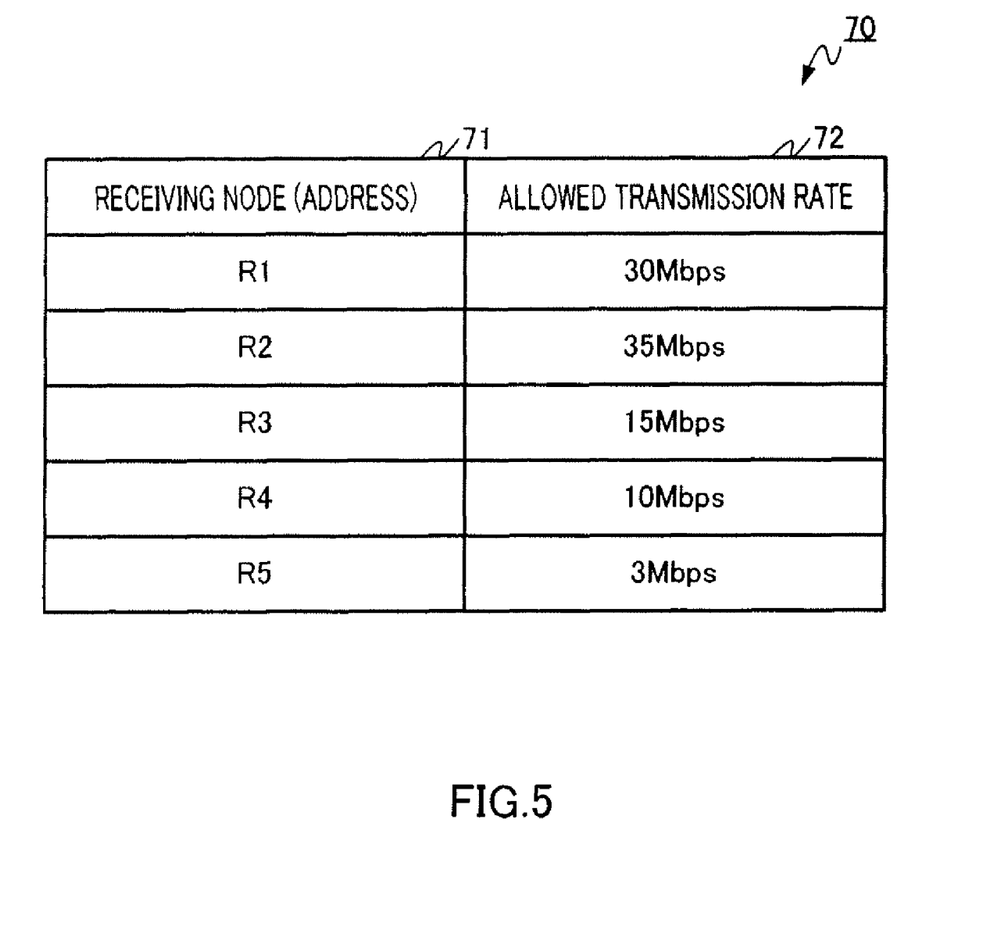
FIG. 5 is a table showing an example of the receiving node information.
Figure 6A:
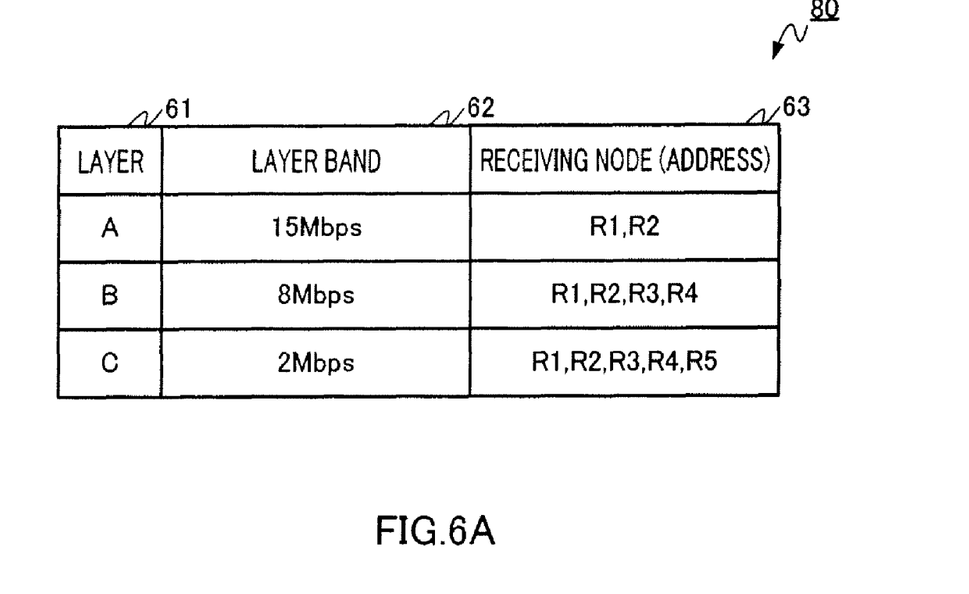
FIG. 6A is a table showing the layers set associated with receiving nodes by the conventional multicast distribution apparatus.

In communication network 1 in FIG. 1, transmitting node 10 first calculates allowed transmission rates for receiving nodes 20 to 24 based on feedback information from receiving nodes 20 to 24, respectively. Next, transmitting node 10 sets up the layers of layered data to be transmitted to receiving nodes 20 to 24 based on the calculated allowed transmission rates. For example, the case is assumed where the layer configuration is shown in FIG. 4 and the allowed transmission rates of receiving nodes 20 to 24 are shown in FIG. 5. In this case, transmitting node 10 determines the layers to be transmitted to receiving nodes 20 to 24 as shown in FIG. 6A.

Next, transmitting node 10 rearranges addresses of respective receiving nodes 20 to 24 in ascending order of the rate that can be transmitted on a per layer basis and determines the order of addresses listed in the address list of each layer from the lower layer. As a result, when the allowed transmission rates of receiving nodes 20 to 24 are the allowed transmission rates 72 shown in FIG. 5, the order of addresses per layer is as shown with receiving nodes (addresses) 63 in FIG. 6B (receiving nodes toward the leftmost are top of address lists).

Finally, transmitting node 10 assigns the headers including the address lists in which addresses are rearranged according to the above described procedure to the layered data in the layers and sends the layered data to the network. The packets per layer sent to the network are delivered to the receiving nodes according to a procedure under the explicit multicast scheme.

As described above, according to the method disclosed in Patent Document 1, the transmitting node specifies destinations using the explicit multicast scheme in distribution using layered multicast scheme, so that it is possible to reduce management and control costs of a multicast group and prevent discarding data from being discarded by error due to the influence of jitter in the network. Furthermore, the transmitting node can control flow rates on the receiving nodes and the receiving nodes can receive and play back data matching the network environment of the receiving nodes.

Patent Document 1: Japanese Patent Application Laid-Open No. 2002-354033

Non-Patent Document 1: R. Boivie, N. Feldman, Y. Imai, W. Livens, D. Ooms, O. Paridaens, E. Muramoto, "Explicit Multicast (Xcast) Basic Specification", draft-ooms-xcast-basic-spec-07.txt, January 2005.

DISCLOSURE OF INVENTION

Problems to be Solved by the Invention

However, with the method described in Patent Document 1, when there are routers that do not support the explicit multicast scheme in the network path, there is a problem that it is difficult for the receiving node that receives layered data of a plurality of layers to establish synchronization of signals between layers.

The above-described problem that occurs when XCAST is used as the explicit multicast scheme will be explained more specifically with reference to the accompanying drawings below.

Figure 6B:
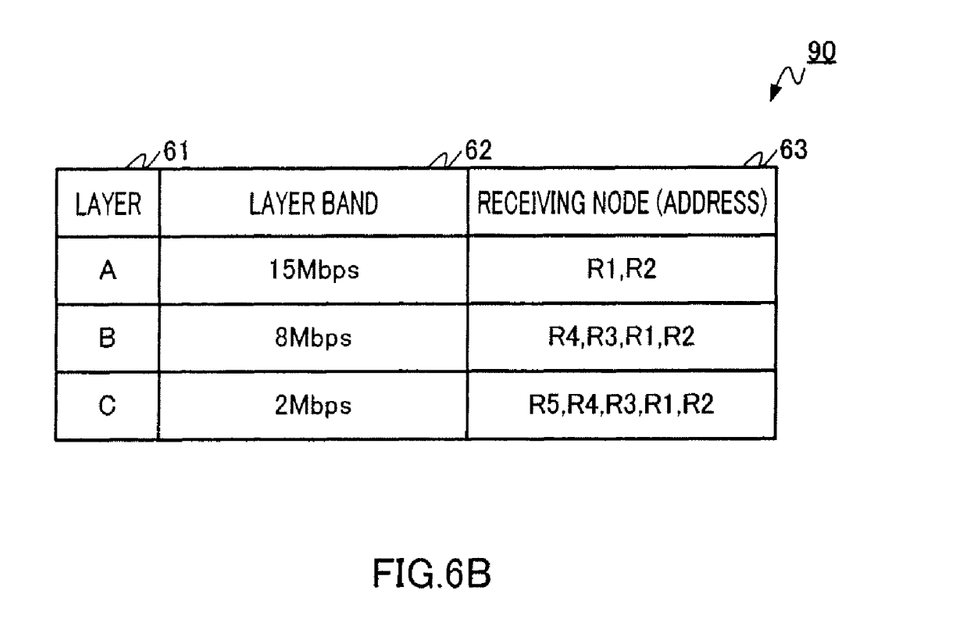
FIG. 6B is a table showing the order of addresses listed in the address list of the layers by the conventional multicast distribution apparatus.

As described above, according to the method disclosed in Patent Document 1, the address list is created from the lower layer, and further the addresses of receiving nodes are described in an address list on a per layer basis in ascending order of reception performance. Therefore, as shown in FIG. 6B, the addresses of the receiving nodes having high allowed transmission rates are located at higher positions in the address list of the higher layer (R1 is in the first position and R2 is in the second position in layer A), whereas the addresses of the receiving nodes having high allowed transmission rates are located at lower positions in the address list of the lower layer (R1 is in the fourth position and R2 is in the fifth position in layer C). In this way, according to the method of Patent Document 1, the order of addresses described in the address list varies on a per layer basis.

Even when the order of addresses varies as such, there is no particular problem if the routers in the network path from the transmitting node to the receiving nodes support XCAST. However, when there are not enough routers that support XCAST in the route, the following problems occur.

The routers that do not support XCAST handle XCAST packets as unicast packets as described above. That is, when there are not enough routers that support XCAST on the communication network, packets per layer are transferred between the receiving nodes in the order of addresses described in the respective address lists. In the example shown in FIG. 6B, the packet delivery route of layer C, which is the base layer, is from fifth receiving node 24 to fourth receiving node 23, from fourth receiving node 23 to third receiving node 22, from third receiving node 22 to first receiving node 20, from first receiving node 20 to second receiving node 21, the packet distribution route of layer B is from fourth receiving node 23 to third receiving node 22, from third receiving node 22 to first receiving node 20, from first receiving node 20 to second receiving node 21, and the packet distribution route of layer A is from first receiving node 20 to second receiving node 21. In this way, when the order of the address list varies between layers, the packet delivery route varies between layers, and so the time required delivering a packet of each layer for an arbitrary receiving node varies. For example, for second receiving node 21, the packet in layer A arrives second in the order, whereas the packet in layer C arrives fifth in the order, and so there is a high probability that the receiving timings varies between the packet in layer A and the corresponding packet in layer C.

In this way, according to the method described in Patent Document 1, there is a problem that when there are routers that do not support XCAST in the network path, the packet delivery route and the duration required for distribution vary on a per layer basis, and so, it is difficult for a receiving node that receives data of a plurality of layers to establish signal synchronization among layers. Furthermore, when the packet delivery route varies on a per layer basis, packet round-trip duration between the transmitting node and receiving node and the rate of packet loss depending on delivery routes also vary on a per layer basis, and so there is also a problem that the transmitting node cannot uniquely determine the allowed transmission rates, which are calculated based on such information, and has difficulty in calculating accurate allowed transmission rate for the receiving node.

It is therefore an object of the present invention to provide a multicast distribution apparatus, multicast distribution method and multicast distribution program that can easily establish signal synchronization between layers at the receiving side and control accurate flow rate at the transmitting side, even when there are routers that do not support an explicit multicast scheme in the network path.

Means for Solving the Problem

The multicast distribution apparatus of the present invention employs a configuration including: a layered coding section that prepares a plurality of pieces of layered data having a layer relationship; a selection section that selects, per receiving node, at least one piece of layered data to be transmitted to a receiving node; an address list generation section that, for each layer of the plurality of pieces of layered data, generates an address list for said each layer by adding addresses of receiving nodes to which layered data belonging to said each layer is transmitted, to an address list comprised of addresses of receiving nodes for layered data belonging to an immediately superior layer; a packet generation section that generates a packet in which the generated address list is assigned to the layered data belonging to said each layer; and a packet transmission section that transmits the packet.

The multicast distribution method of the present invention includes the steps of preparing a plurality of pieces of layered data having a layer relationship; selecting, per receiving node, at least one piece of layered data to be transmitted to a receiving node; for each layer of the plurality of pieces of layered data, generating an address list for said each layer by adding addresses of receiving nodes to which layered data belonging to said each layer is transmitted, to an address list comprised of addresses of receiving nodes for layered data belonging to an immediately superior layer; generating a packet in which the generated address list is assigned to the layered data belonging to said each layer; and transmitting the packet.

The multicast distribution program of the present invention causes a computer to execute the steps of: preparing a plurality of pieces of layered data having a layer relationship;

selecting, per receiving node, at least one piece of layered data to be transmitted to a receiving node; for each layer of the plurality of pieces of layered data, generating an address list for said each layer by adding addresses of receiving nodes to which layered data belonging to said each layer is transmitted, to an address list comprised of addresses of receiving nodes for layered data belonging to an immediately superior layer; generating a packet in which the generated address list is assigned to the layered data belonging to said each layer; and transmitting the packet.

Advantageous Effect of the Invention

According to the present invention, even when there are routers that do not support an explicit multicast scheme in a network path, the receiving side (receiving node) can easily establish signal synchronization between layers and the transmitting side (transmitting node) can calculate accurate allowed transmission rates.

BEST MODE FOR CARRYING OUT THE INVENTION

Now, embodiments of the present invention will be described in detail with reference to the accompanying drawings. With the present invention, what is simply referred to as a "packet" refers to an explicit multicast scheme packet. In a case where a plurality of pieces of layered data depends on receiving and combining the pieces of layered data, the "higher layer" is referred to as a differential layer required to receive and play back data of higher quality, and conversely, a layer required to combine the higher layers is described as a "lower layer."

Figure 7:
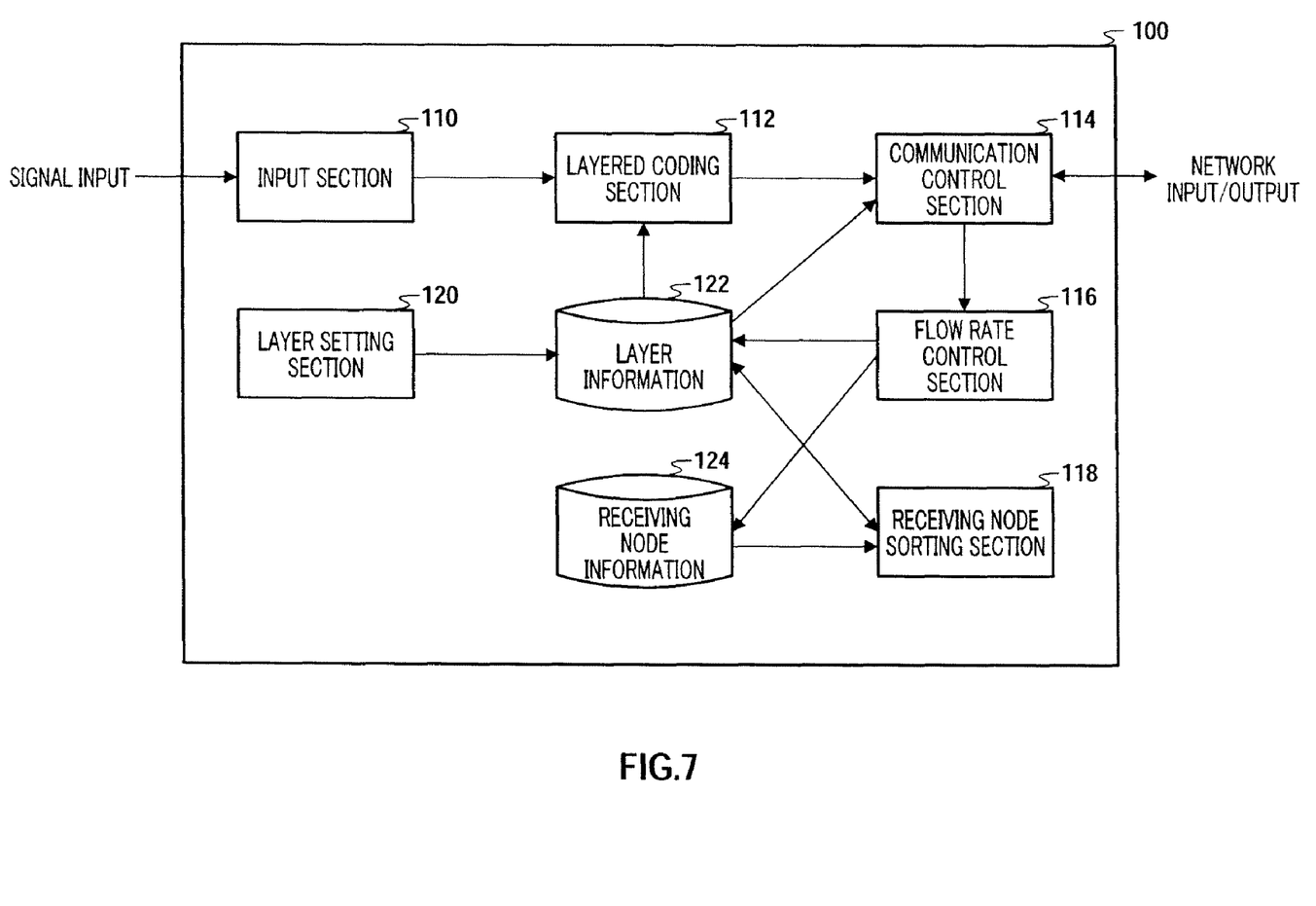
FIG. 7 is a block diagram showing a configuration of the multicast distribution apparatus according to an embodiment of the present invention.
Figure 8:
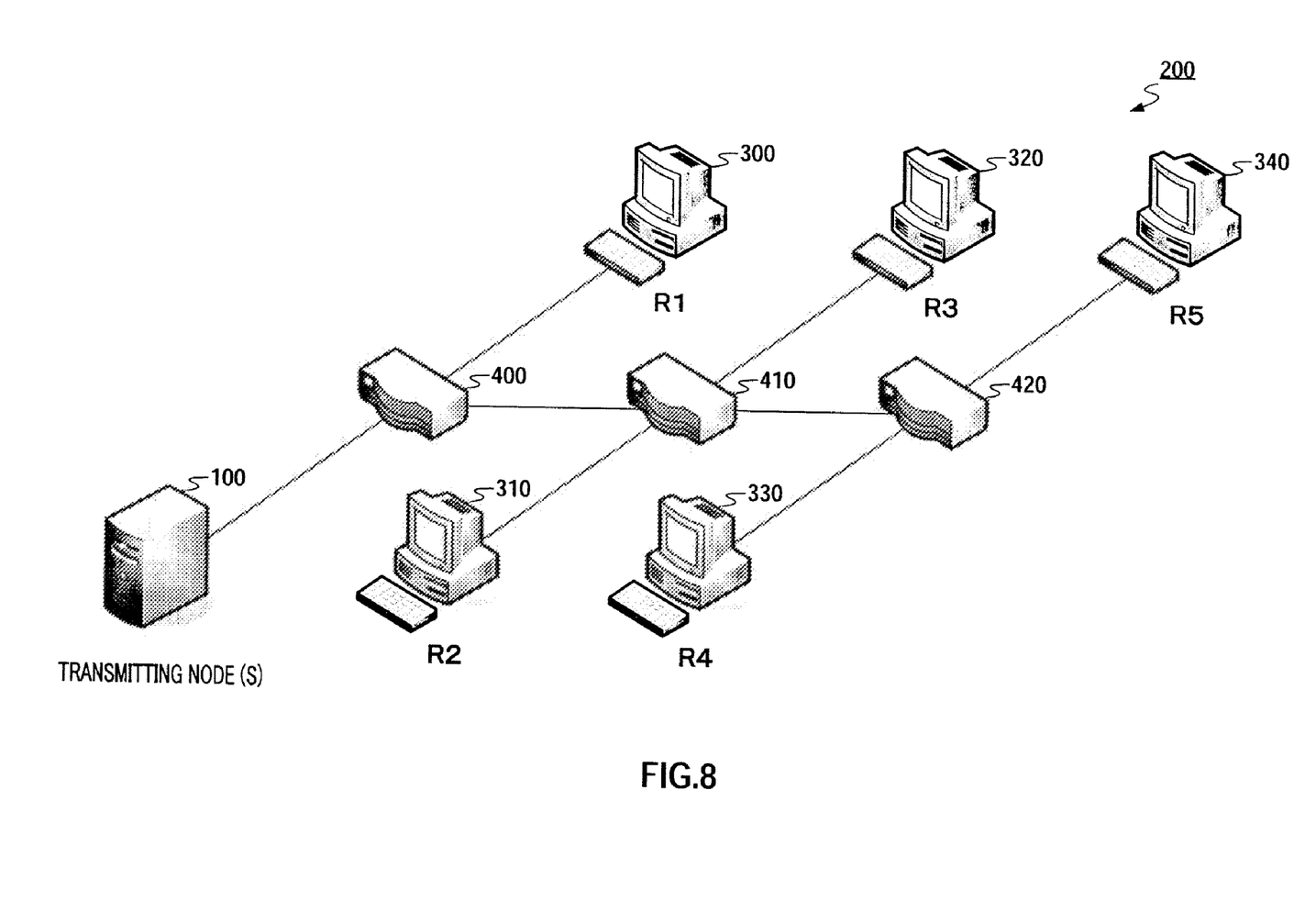
FIG. 8 illustrates an overview of the communication network for explaining a flow of multicast distribution using the multicast distribution apparatus as a transmitting node according to the present embodiment.

FIG. 7 is a block diagram showing a configuration of the multicast distribution apparatus according to an embodiment of the present invention. FIG. 8 illustrates an overview of a communication network for explaining the operations of the multicast distribution apparatus shown in FIG. 7.

In FIG. 8, communication network 200 is constructed of multicast distribution apparatus 100 having the configuration in FIG. 7, five receiving nodes 300 to 340 and three routers 400 to 420.

Receiving nodes (R1 to R5) 300 to 340 receive packets of layers delivered by multicast distribution apparatus 100. Furthermore, receiving nodes 300 to 340 decode the received data and combine base layer data and differential layer data.

Routers 400 to 420 perform routing based on destination address information included in a packet.

In FIG. 7, multicast distribution apparatus 100 is provided with input section 110, layered coding section 112, communication control section 114, flow rate control section 116, receiving node sorting section 118, layer setting section 120, layer information storage section 122 and receiving node information storage section 124.

Input section 110 applies input processing to an input signal (original data) such as a video signal and outputs the original data after the input processing to layered coding section 112.

Based on layer information stored in layer information storage section 122, layered coding section 112 divides the inputted original data and generates data of the base layer and data of at least one differential layer through layered coding. Hereinafter, "layered data" will be referred to as both the base layer data and the differential layer data. Furthermore, layered coding section 112 outputs the layered data of each layer generated to communication control section 114.

Communication control section 114 creates a header matching the layered data of each layer based on the layer information stored in layer information storage section 122, assigns the header created to the layered data of each layer generated by layered coding section 112 and generates a packet. Furthermore, communication control section 114 transmits the packet generated to a communication network, receives feedback information on reception conditions from receiving nodes 300 to 340 and outputs the received feedback information to flow rate control section 116.

Flow rate control section 116 calculates the allowed transmission rates for receiving nodes 300 to 340 based on the feedback information on receiving nodes 300 to 340 inputted from communication control section 114 and determines the layer of a packet to be transmitted to each receiving node 300 to 340. In this case, when layered data of a higher layer is transmitted to an arbitrary receiving node, each layered data lower than the layered data of the layer is also transmitted. Furthermore, flow rate control section 116 additionally writes information on the layer of the packet to be transmitted to receiving nodes 300 to 340 to the layer information stored in layer information storage section 122. Furthermore, flow rate control section 116 summarizes information such as reception capacity, RTT (Round Trip Time), packet loss rate of respective receiving nodes 300 to 340 as receiving node information based on the feedback information of receiving nodes 300 to 340 inputted from communication control section 114 and stores the receiving node information in receiving node information storage section 124.

Receiving node sorting section 118 determines the order of addresses to be described in the address list of the packet of each layer, in order (descending order) from the address list of the highest layer to the address list of the lowest layer. In this case, upon determining the order of addresses on an arbitrary layer, receiving node sorting section 118 follows the order of addresses determined in an immediately superior layer as is and then determines the order of addresses of the remaining receiving nodes in the arbitrary layer. Furthermore, receiving node sorting section 118 changes the order of addresses in the layer information stored in layer information storage section 122 based on the determined order of addresses.

Layer setting section 120 sets up the layer configurations and the layer bands when layered coding section 112 separates to generate layered data, and stores information in layer information storage section 122 as layer information. FIG. 4 is an example of the layer information created by layer setting section 120. Layer information 60 is made up, for example, of information showing the layer configuration of layered data 61, layer band 62 and receiving node (address) 63 to which each layered data is transmitted. In the example shown in FIG. 4, layer C is a base layer corresponding to the lowest layer and generates data of 2 Mbps. Layer B is a differential layer corresponding to a layer higher than layer C and generates data of 8 Mbps. Layer A is a differential layer corresponding to the highest layer and generates data of 15 Mbps. Information necessary for setting up layers (including layer configurations and bands used for layers) is provided from an upper layer in the internal system or an external device or provided by the user's input operations.

Layer information storage section 122 stores layer information describing the layer configuration, bands used for layers, address information of receiving nodes and so on in layered multicast distribution. FIG. 6 is an example of the layer information stored in layer information storage section 122 and layer information 80 in FIG. 6A is produced by adding receiving node addresses 63 to layer information 60 shown in FIG. 4 by flow rate control section 116. Layer information 90 in FIG. 6B is produced by rearranging the order of receiving node addresses 63 in each layer described in layer information 80 shown in FIG. 6A by receiving node sorting section 118.

Receiving node information storage section 124 stores the receiving node information describing such as allowed transmission rates, reception conditions and RTT of receiving nodes. FIG. 5 shows an example of receiving node information. Receiving node information 70 is made up, for example, of information showing each receiving node address 71 and allowed transmission rate value 72 for each receiving node.

Hereinafter, the operations of multicast distribution apparatus 100 configured as described above will be explained.

First, layer setting section 120 sets up the layer configurations and the bands used for layers when layered data is separated and a plurality of pieces of layered data are generated. Layer setting section 120 stores the setup information in layer information storage section 122 as the layer information.

Layered coding section 112 then performs layered coding on the original data such as video data inputted through input section 110 based on the layer information stored in layer information storage section 122 and separates the coded data to generate one piece of basic data and at least one piece of differential data. Layered coding section 112 then outputs the generated layered data to communication control section 114.

Communication control section 114 then transmits the generated packet of each layer based on the layer information (e.g., layer information shown in FIG. 9B) stored in layer information storage section 122.

Receiving nodes 300 to 340 receiving the packets transmit feedback information such as reception conditions to multicast distribution apparatus 100 regularly or when a packet loss occurs, for example. Feedback information includes, for example, information on the RTT and packet loss rate.

Communication control section 114 then receives the feedback information from receiving nodes 300 to 340 and outputs the inputted feedback information to flow rate control section 116.

Flow rate control section 116 calculates the allowed transmission rates for receiving nodes 300 to 340, respectively, based on the inputted feedback information. The calculation result of the allowed transmission rates is, for example, as shown in FIG. 5 and stored in receiving node information storage section 124 as receiving node information. The receiving node information may also include information on the RTT and the packet loss rate included in the feedback information.

Figure 9A:
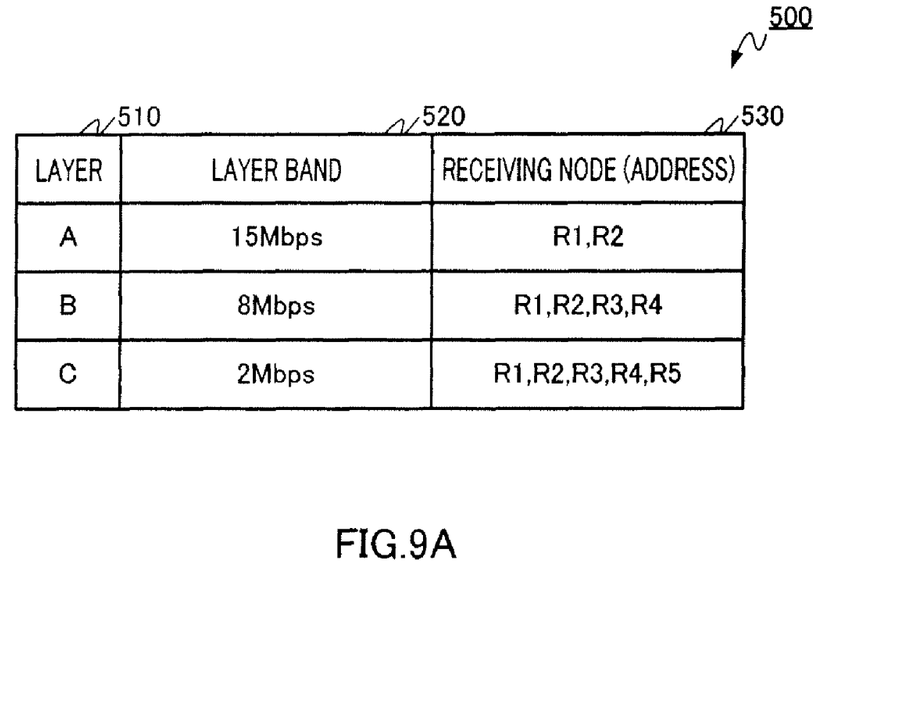
FIG. 9A is a table showing the layer information created by the flow rate control section of the multicast distribution apparatus according to the present embodiment.

Furthermore, flow rate control section 116 determines the layer of data to be transmitted to receiving nodes 300 to 340 based on the calculated allowed transmission rates. For example, in the layer configuration shown in FIG. 4, when flow rate control section 116 calculates the allowed transmission rates of receiving nodes 300 to 340 as shown in FIG. 5, the layers of data that communication control section 114 transmits to receiving nodes 300 to 340 are as follows. The allowed transmission rate for first receiving node 300 is 30 Mbps, so that communication control section 114 transmits all layered data of layers A to C (total 25 Mbps). Likewise, the allowed transmission rate for second receiving node 310 is 35 Mbps, so that communication control section 114 transmits all layered data of layers A to C (total 25 Mbps). The allowed transmission rate for third receiving node 320 is 15 Mbps, so that communication control section 114 transmits layered data of layers B and C (total 10 Mbps). The allowed transmission rate for fourth receiving node 330 is 10 Mbps, so that communication control section 114 transmits layered data of layers B and C (total 10 Mbps). The allowed transmission rate for fifth receiving node 340 is 3 Mbps, so that communication control section 114 transmits only layered data of layer C (total 2 Mbps). Flow rate control section 116 determines the layers in the layered data to be transmitted to receiving nodes 300 to 340 as such. Flow rate control section 116 describes the determined result in the layer information in layer information storage section 122. For example, in the above described case, the layer information is as shown in FIG. 9A.

Receiving node sorting section 118 then determines the order of addresses in the address list of the packet of each layer, in order from the address list of the highest layer to the address list of the lowest layer. In this case, upon determining the order of addresses for an arbitrary layer, receiving node sorting section 118 follows the order of the addresses determined in an immediately superior layer as is and then adds the order of the addresses of the remaining receiving nodes in the arbitrary layer. A main feature of the present invention is seen in this processing and will be described later with reference to FIG. 10. Furthermore, receiving node sorting section 118 reorders the order of addresses of receiving nodes described in the layer information in layer information storage section 122 based on the order of addresses for individual layers determined earlier. For example, in the above described case, layer information 500 shown in FIG. 9A makes layer information 600 shown in FIG. 9B.

Communication control section 114 then creates a header associated with the layered data in each layer based on the layer information stored in layer information storage section 122. Communication control section 114 assigns the created header to the layered data in each layer generated by layered coding section 112 and generates a packet. Furthermore, communication control section 114 transmits the generated packet to a communication network.

Hereinafter, the transmitting node repeats a series of the above described processing as input of feedback information, calculation of allowed transmission rates, determination of layers, rearrangement of addresses, generation and transmission of packets until multicast distribution is completed.

Flow rate control section 116 determines a layer of a packet to be transmitted to receiving nodes 300 to 340 based on feedback information from receiving nodes 300 to 340 and additionally writes the layer to the layer information. Therefore, when communication control section 114 transmits the first packet, flow rate control section 116 has not received the feedback information yet, and communication control section 114 cannot determine the layers to be transmitted to receiving nodes 300 to 340 based on the layer information. In this case, communication control section 114 can determine the layer of a packet according to an arbitrary rule. For example, communication control section 114 may also transmit packets of all layers to all receiving nodes 300 to 340. In this case, flow rate control section 116 may transmit fewer differential layer packets thereafter, only to the receiving nodes that have returned a packet loss feedback. Furthermore, as another example, communication control section 114 may transmit only the packet of the base layer to all receiving nodes 300 to 340. In this case, flow rate control section 116 may transmit more the differential layer packets thereafter, to the receiving nodes in which packet loss does not occur.

Figure 10:
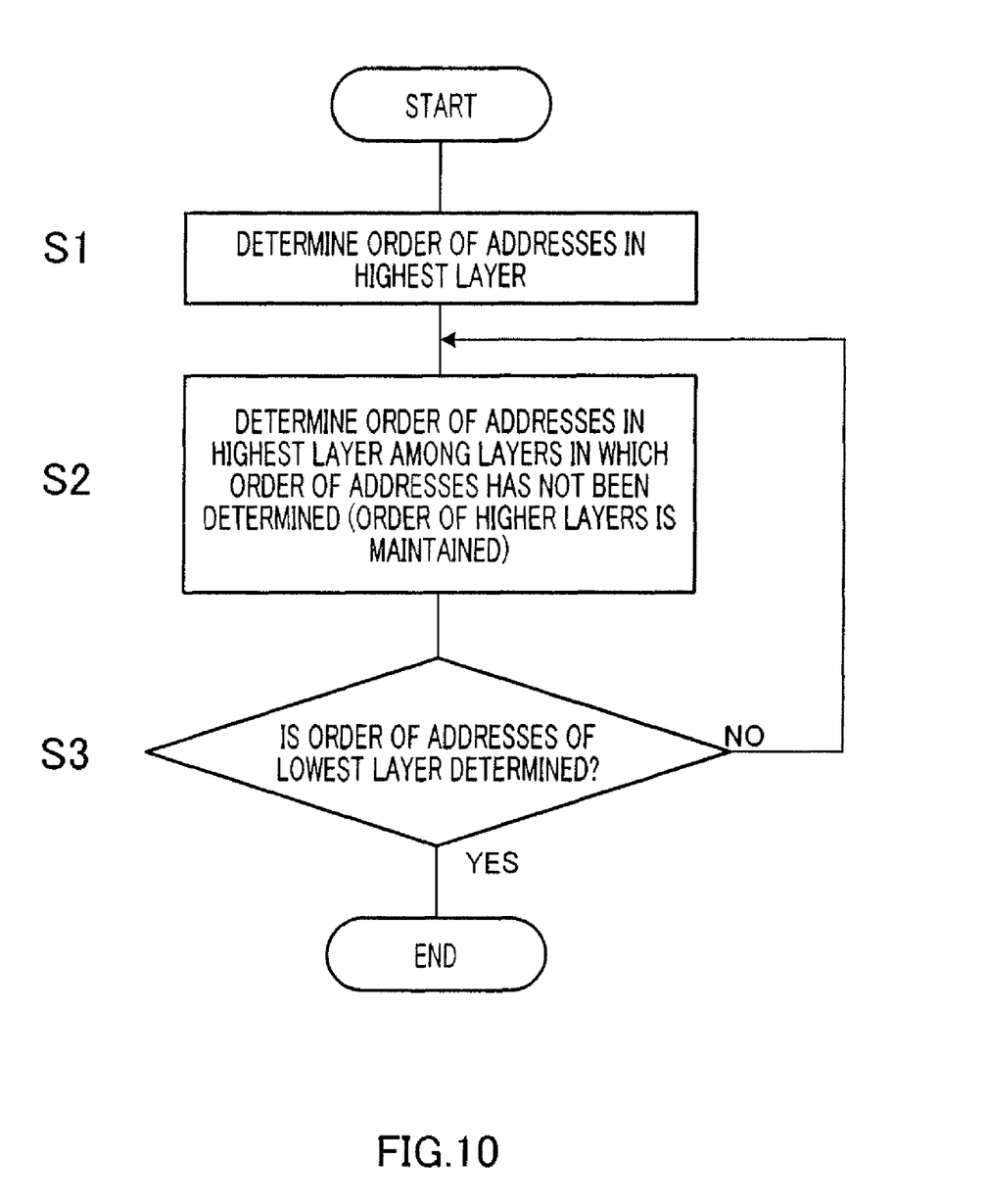
FIG. 10 is a flowchart showing a flow of the address order determining steps by the receiving node sorting section of the multicast distribution apparatus according to the present embodiment.

FIG. 10 is a flowchart showing processing whereby receiving node sorting section 118 determines the order of addresses in each layer.

First, in step S1, the order of addresses in the highest layer is determined based on an arbitrary rule (for example, an allowed transmission rate).

Next, in step S2, the order of addresses in the highest layer is determined among layers in which the order of the addresses has not been determined. In this case, the order of addresses determined in an immediately superior layer is followed as is and then the order of the addresses of the remaining receiving nodes is determined based on the arbitrary rule.

Next, it is decided in step S3 whether or not the order of addresses is determined in the lowest layer (that is, the base layer). When the order of addresses in the lowest layer is determined, it is decided that the order of addresses is determined in all layers and the present flow is finished. On the other hand, when the order of addresses in the lowest layer has not been determined, it is decided that there are still layers in which order of addresses has not been determined and the process returns to step S2 above. That is, step 2 and step 3 above are repeated until the order of addresses is determined in all layers.

Based on the above described flow, the processing will be explained specifically where receiving node sorting section 118 in the layer configuration of FIG. 9A determines the order of addresses when the allowed transmission rates in the receiving nodes are shown in FIG. 5. A case will be shown here where receiving node sorting section 118 determines the order of addresses in a layer based on the allowed transmission rates in descending order.

First, receiving node sorting section 118 determines the order of addresses in layer A, which is the highest layer (stepSl). Here, receiving node sorting section 118 determines R2 (35 Mbps) to R1 (30 Mbps) in descending order of the allowed transmission rate. Next, receiving node sorting section 118 determines the order of addresses in layer B, which is an immediately inferior layer to layer A (step S2). In this case, the order determined in layer A is followed as is and the first and second addresses in layer B are also determined as R2 to R1, and the third and subsequent addresses are Determined with remaining R3 and R4. Here, receiving node sorting section 118 determines the order of addresses as R3 (15 Mbps) to R4 (10 Mbps) in descending order of the allowed transmission rate as well. Therefore, the overall order of the addresses is from R2 to R1, from R1 to R3, and from R3 to R4. Next, receiving node sorting section 118 determines whether or not the order of addresses is determined in layer C, which is the lowest layer (step S3). Here, the order of addresses in layer C is not determined yet, so that the step returns to step S2. Next, layer C is the only layer in which the order of addresses is not determined yet, receiving node sorting section 118 determines the order of addresses in layer C (step S2). In this case, the order of the addresses determined in layer B, which is a higher layer, is followed as is, the order of the addresses in layer C is also determined as from R2 to R1, from R2 to R3 and from R3 to R4 from the first address and remaining R5 is assigned to the fifth address. Next, receiving node sorting section 118 decides whether or not the order of addresses in layer C, which is the lowest layer (step S3), and the present flow is finished because the order of addresses in layer C is already determined. As a result of this processing, the order of addresses in the address list of the layers is as shown in FIG. 9B.

Figure 9B:
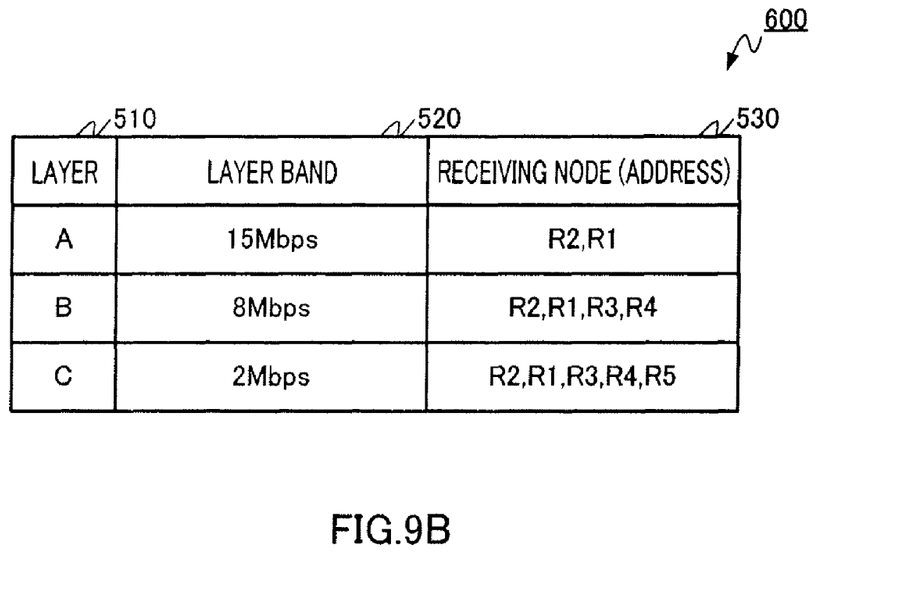
FIG. 9B is a table showing the layer information created by the receiving node sorting section of the multicast distribution apparatus according to the present embodiment.

Through the steps explained in the flow above, receiving node sorting section 118 determines the order of addresses in the address list, so that the order of addresses of the receiving nodes become the same among all the layers as shown in FIG. 9B, for example, second receiving node (R2) 310 is the first receiving destination and the third receiving node is the third receiving destination in all the layers.

As described above, when there are not enough routers that support XCAST on the network, packets per layer are transferred in the order of addresses described in their respective address lists. Therefore, in the example shown in FIG. 9B, the packet delivery route of layer C, which is the base layer, is from second receiving node 310 to first receiving node 300, from first receiving node 300 to third receiving node 320, from third receiving node 320 to fourth receiving node 330 and from fourth receiving node 330 to fifth receiving node 340, the packet distribution route of layer B is from second receiving node 310 to first receiving node 300, from first receiving node 300 to third receiving node 320 and from third receiving node 320 to fourth receiving node 330, and the packet distribution route of layer A is from second receiving node 310 to first receiving node 300.

In this way, according to the present embodiment, the order of the receiving nodes in the address list of packets to be transmitted is the same among layers, so that the packet in each layer can be delivered in the same route even when there are routers that do not support the explicit multicast scheme in the network path. As a result, each receiving node can easily establish signal synchronization among layers and the transmitting node can calculate accurate allowed transmission rates for the receiving nodes.

Although a case has been explained with the present embodiment here where the multicast distribution apparatus determines the order of receiving nodes per layer based on arbitrary rules, examples of arbitrary rule including an allowed transmission rate, RTT and a packet loss rate. What information the multicast distribution apparatus adopts as a rule for deciding the order may be appropriately selected depending on the situations. For example, when the number of routers that support XCAST in the route is not enough and packets are often transferred between receiving nodes, receiving nodes of low allowed transmission rates constitute a limiting factor for packet transfer rates, so that it is preferable that the multicast distribution apparatus determines the order of addresses in descending order of allowed transmission rates.

Furthermore, although a case has been explained with the present embodiment here where the multicast distribution apparatus is designed to determine allowed transmission rates of receiving nodes, the receiving nodes themselves may determine the allowed reception rates of the receiving nodes and request the allowed reception rates to the multicast distribution apparatus.

Furthermore, although a case has been explained with the present embodiment here where the multicast distribution apparatus is designed to determine the layers of packets to be transmitted based on feedback information from the receiving node, the user may also directly set up the layers to be transmitted.

Furthermore, although a case has been explained with the present embodiment here where the multicast distribution apparatus is designed to generate layered coded data from the original data, layered coded data generated outside may also be inputted.

The disclosure of Japanese Patent Application No. 2006-070039, filed on Mar. 14, 2006, including the specification, drawings and abstract is incorporated herein by reference in its entirety.

INDUSTRIAL APPLICABILITY

The multicast distribution apparatus, multicast distribution method and multicast distribution program according to the present invention are suitable for use in, for example, distribution of videos on the Internet, and particularly, on a network where the proportion of routers that do not support XCAST is large.

The invention claimed is:

1. A multicast distribution apparatus comprising:
a layered coding section that prepares layered data for each of a plurality of layers having a layer relationship;
a selection section that selects, per receiving node, layered data to be transmitted to a receiving node;
an address list generation section that, for each of the plurality of layers, generates an address list by adding a first set of addresses of receiving nodes to an address list comprised of a second set of addresses of receiving nodes, the first set including addresses of receiving nodes for layered data belonging to each layer, the second set including addresses of receiving nodes for layered data belonging to an immediately higher layer;
a packet generation section that generates a packet in which the generated address list is assigned to the layered data belonging to said each layer; and
a packet transmission section that transmits the packet, wherein:
the layered coding section generates layered data for each of a plurality of layer bandwidths each corresponding to a different communication rate,
the address list generation section generates, for each layer bandwidth, an address list of receiving nodes that each have an established communication rate encompassing the layer bandwidth's communication rate,
the apparatus further comprising a receiving node sorting section that arranges, within the address list of each layer, the order of the addresses of the receiving nodes in accordance with the communication rate of each receiving node such that each receiving node identified in the address list has an equal or higher communication data rate than all preceding receiving nodes identified in the address list, and wherein:
the first-to-last order of the addresses within the address list of each layer bandwidth identifies the order in which the receiving nodes receive the layered data of the layer bandwidth through unicast communication.

2. The multicast distribution apparatus of claim 1, wherein the layered data is communicated within an explicit multicast packet.

3. The multicast distribution apparatus of claim 1, wherein the established communication rate of each receiving node is determined from feedback information received from the receiving node.

4. A multicast distribution method comprising:
preparing layered data for each of a plurality layers having a layer relationship;
selecting, per receiving node, layered data to be transmitted to a receiving node;
generating an address list, for each of the plurality of layers, by adding a first set of addresses of receiving nodes to an address list comprised of a second set of addresses of receiving nodes, the first set including addressees of receiving nodes for layered data belonging to each layer, the second set including addresses of receiving nodes for layered data belonging to an immediately higher layer;
generating a packet in which the generated address list is assigned to the layered data belonging to said each layer;
transmitting the packet; wherein:
the preparation of layered data generates layered data for each of a plurality of layer bandwidths corresponding to a distinct communication rate,
the generation of an address list generates, for each layer, an address list of receiving nodes that each have an established communication rate encompassing the layer bandwidth's communication rate; and
the method further comprising arranging, within the address list of each layer bandwidth, the order of the addresses of the receiving nodes in accordance with the communication rate of each receiving node such that each receiving node identified in the address list has an equal or higher communication data rate than all preceding receiving nodes identified in the address list, wherein:
the first-to-last order of the addresses within the address list of each layer bandwidth identifies the order n which the receiving nodes receive the layered data of the layer bandwidth through unicast communication.

5. A non-transitory computer readable medium storing instructions that, when executed by a computer, cause a network multicast transmission apparatus to perform the operations of:
- preparing layered data for each of a plurality of layers having a layer relationship;
- selecting, per receiving node, layered data to be transmitted to a receiving node;
- generating an address list, for each of the plurality of layers, by adding a first set of addresses of receiving nodes to an address list comprised of a second set of addresses of receiving nodes, the first set including addresses of receiving nodes for layered data belonging to each layer, the second set including addresses of receiving nodes for layered data belonging to an immediately higher layer;
- generating a packet in which the generated address list is assigned to the layered data belonging to said each layer;
- transmitting the packet, wherein:
- the preparation of layered data generates layered data for each of a plurality of layer bandwidths corresponding to a distinct communication rate,
- the generation of an address list generates, for each layer, an address list of receiving nodes that each have an established communication rate encompassing the layer bandwidth's communication rate; and
- the instructions further cause the network multicast transmission apparatus to perform the operation of arranging, within the address list of each layer bandwidth, the order of the addresses of the receiving nodes in accordance with the communication rate of each receiving node such that each receiving node identified in the address list has an equal or higher communication data rate than all preceding receiving nodes identified in the address list, wherein:
- the first-to-last order of the addresses within the address list of each layer bandwidth identifies the order in which the receiving nodes receive the layered data of the layer bandwidth through unicast communication.

6. A multicast distribution apparatus comprising:
- a layered coding section that prepares layered data for each of a plurality of layers having a layer relationship;
- a selection section that selects, per receiving node, layered data to be transmitted to a receiving node;
- an address list generation section that, for each of the plurality of layers, generates an address list by adding a first set of addresses of receiving nodes to an address list comprised of a second set of addresses of receiving nodes, the first set including addresses of receiving nodes for layered data belonging to each layer, the second set including addresses of receiving nodes for layered data belonging to an immediately higher layer;
- a packet generation section that generates a packet in which the generated address list is assigned to the layered data belonging to said each layer; and
- a packet transmission section that transmits the packet, wherein:
- the selection section determines a layer of layered data to be transmitted to each of the plurality of receiving nodes,
- the address list generation section:
- generates, for each of the plurality of layers, and address list shown in a header given to the layered data for the determined layer,
- determines an order of describing addresses included in the address list for each of the plurality of layers in descending order from a highest layer to a lowest layer, and
- when determining an order of describing addresses included in the address list for a predetermined layer other than the highest layer, first determines described positions of the same addresses as addresses included in an address list for an immediately higher layer than the predetermined layer, and next determines a described position of an additional address which is not included in the address list for the immediately higher layer, such that the described position of the additional address is placed posterior to all of the described positions of the same addresses.

7. The multicast distribution apparatus according to claim 6, wherein the packet is an explicit multicast packet.

8. The multicast distribution apparatus according to claim 6, wherein the selection section determines the layer of the layered data to be transmitted to each of the plurality of receiving nodes, based on feedback information received from each of the plurality of receiving nodes.

9. The multicast distribution apparatus according to claim 6, wherein:
- when determining an order of describing addresses included in an address list for the highest layer, the address list generation section compares communication rates permitted for a subset of the receiving nodes to each other, the subset of the receiving nodes corresponding to all addresses included in the address list for the highest layer, and
- when determining an order of describing addresses included in an address list for another layer other than the highest layer, the address list generation section compares communication rates permitted for another subset of the receiving nodes to each other, the other subset of the receiving nodes corresponding to additional addresses which are not included in the address list for the immediately higher layer, among all addresses included in the address list for the other layer.

10. A multicast distribution method comprising:
- preparing layered data for each of a plurality of layers having a layer relationship;
- selecting, per receiving node, layered data to be transmitted to a receiving node;
- generating an address list, for each of the plurality of layers, by adding a first set of addresses of receiving nodes to an address list comprised of a second set of addresses of receiving nodes, the first set including addresses of receiving nodes for layered data belonging to each layer, the second set including addresses of receiving nodes for layered data belonging to an immediately higher layer;
- generating a packet in which the generated address list is assigned to the layered data belonging to said each layer; and
- transmitting the packet; wherein:
- the selection of layered data determines a layer of layered data to be transmitted to each of the plurality of receiving nodes,
- the generation of an address list:
- generates, for each of the plurality of layers, and address list shown in a header given to the layered data for the determined layer,
- determines an order of describing addresses included in the address list for each of the plurality of layers in descending order from a highest layer to a lowest layer, and
- when determining an order of describing addresses included in the address list for a predetermined layer other than the highest layer, first determines described positions of the same addresses as addresses included in an address list for an immediately higher layer than the predetermined layer, and next determines a described position of an additional address which is not included in the address list for the immediately higher layer, such that the described position of the additional address is placed posterior to all of the described positions of the same addresses.

11. A non-transitory computer readable medium storing instructions that, when executed by a computer, cause a network multicast transmission apparatus to perform the operations of:

preparing layered data for each of a plurality of layers having a layer relationship;

selecting, per receiving node, layered data to be transmitted to a receiving node;

generating an address list, for each of the plurality of layers, by adding a first set of addresses of receiving nodes to an address list comprised of a second set of addresses of receiving nodes, the first set including addresses of receiving nodes for layered data belonging to each layer, the second set including addresses of receiving nodes for layered data belonging to an immediately higher layer;

generating a packet in which the generated address list is assigned to the layered data belonging to said each layer; and transmitting the packet, wherein:

the selection of layered data determines a layer of layered data to be transmitted to each of the plurality of receiving nodes, the generation of an address list:

generates, for each of the plurality of layers, and address list shown in a header given to the layered data for the determined layer, determines an order of describing addresses included in the address list for each of the plurality of layers in descending order from a highest layer to a lowest layer, and when determining an order of describing addresses included in the address list for a predetermined layer other than the highest layer, first determines described positions of the same addresses as addresses included in an address list for an immediately higher layer than the predetermined layer, and next determines a described position of an additional address which is not included in the address list for the immediately higher layer, such that the described position of the additional address is placed posterior to all of the described positions of the same addresses.

* * * * *